United States Patent
Legaspi Felipe et al.

(10) Patent No.: US 10,760,008 B2
(45) Date of Patent: *Sep. 1, 2020

(54) COMPOSITIONS AND METHODS OF REMOVING CONTAMINANTS IN REFINERY DESALTING

(71) Applicant: Baker Hughes, a GE company, LLC, Houston, TX (US)

(72) Inventors: Mary Jane Legaspi Felipe, Sugar Land, TX (US); Jerry J. Weers, Richmond, TX (US); Tran M. Nguyen, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 53 days.

This patent is subject to a terminal disclaimer.

(21) Appl. No.: 15/997,127

(22) Filed: Jun. 4, 2018

(65) Prior Publication Data
US 2018/0346826 A1   Dec. 6, 2018

Related U.S. Application Data

(60) Provisional application No. 62/515,281, filed on Jun. 5, 2017.

(51) Int. Cl.
*C10G 31/00* (2006.01)
*C10G 31/08* (2006.01)
*C10G 33/02* (2006.01)

(52) U.S. Cl.
CPC .............. *C10G 31/08* (2013.01); *C10G 33/02* (2013.01); *C10G 2300/203* (2013.01); *C10G 2300/205* (2013.01)

(58) Field of Classification Search
CPC ........ C10G 31/08; C10G 33/00; C10G 33/02; C10G 33/04; C10G 2300/203; C10G 2300/205
See application file for complete search history.

(56) References Cited

U.S. PATENT DOCUMENTS 4,439,345 A * 3/1984 Duke .................. B01D 17/047
208/187
4,778,589 A 10/1988 Reynolds
(Continued)

FOREIGN PATENT DOCUMENTS

WO   2004020553 A1   3/2004

OTHER PUBLICATIONS

Fischer, K., et al., "Removal of Heavy Metals from Soil Components and Soils by Natural Chelating Agents," Water, Air and Soil Pollution, 2002, 271-288.
(Continued)

*Primary Examiner* — Prem C Singh
*Assistant Examiner* — Brandi M Doyle
(74) *Attorney, Agent, or Firm* — Mossman, Kumar & Tyler, P.C.

(57) ABSTRACT

It has been discovered that contaminants such as metals and/or amines can be transferred from a hydrocarbon phase to a water phase in an emulsion breaking process by using a composition that contains water-soluble C5-C12 polyhydroxy carboxylic acids, ammonium salts thereof, alkali metal salts thereof, and mixtures of all of these. The composition may also optionally include a mineral acid to reduce the pH of the desalter wash water. The method permits transfer of metals and/or amines into the aqueous phase with little or no hydrocarbon phase under-carry into the aqueous phase. Resolving the emulsion into the hydrocarbon phase and the aqueous phase occurs in a refinery desalting process using electrostatic coalescence. The composition is particularly useful in treating crude oil emulsions, and in removing calcium and other metals therefrom. The polyhydroxy carboxylic acid additionally inhibits metal corrosion of metal pipe or other equipment used in a crude unit.

20 Claims, 2 Drawing Sheets

(56) References Cited

U.S. PATENT DOCUMENTS

| | | | |
|---|---|---|---|
| 4,853,109 A | 8/1989 | Reynolds | |
| 5,078,858 A | 1/1992 | Hart et al. | |
| 7,497,943 B2* | 3/2009 | Nguyen | B01D 17/0217 |
| | | | 208/251 R |
| 8,372,271 B2* | 2/2013 | Nguyen | B01D 17/0217 |
| | | | 208/252 |
| 9,434,890 B2* | 9/2016 | Nguyen | B01D 17/0217 |
| 9,963,642 B2* | 5/2018 | Nguyen | B01D 17/0217 |
| 2004/0045875 A1* | 3/2004 | Nguyen | B01D 17/0217 |
| | | | 208/251 R |
| 2011/0120913 A1 | 5/2011 | Snawerdt | |
| 2015/0376041 A1* | 12/2015 | Felipe | C01B 5/00 |
| | | | 423/269 |
| 2015/0376799 A1 | 12/2015 | Felipe et al. | |
| 2016/0229726 A1 | 8/2016 | Felipe et al. | |

OTHER PUBLICATIONS

Lordo, S., et al., "Desalter Acidification Additives and Their Potential Impacts on Crude Units," NACE Corrosion 2008, Paper No. 08556, 2008, 1-12.

* cited by examiner

|  | pH = 5.0 | pH = 5.5 | pH = 6.5 |
|---|---|---|---|
| Untreated |  |  |  |
| Treated |  |  |  |

COMPOSITIONS AND METHODS OF REMOVING CONTAMINANTS IN REFINERY DESALTING

CROSS-REFERENCE TO RELATED APPLICATION

This application claims the benefit of U.S. Provisional Patent Application No. 62/515,281 filed Jun. 5, 2017 incorporated herein by reference in its entirety.

TECHNICAL FIELD

The present invention relates to methods and compositions for separating emulsions of hydrocarbons and water, and more particularly relates, in one embodiment, to methods and compositions for transferring contaminants to an aqueous phase from a hydrocarbon phase in an emulsion breaking process using electrostatic coalescence.

BACKGROUND

In an oil refinery, the desalting of crude oil has been practiced for many years. The crude is usually contaminated from several sources, including, but not necessarily limited to:

Brine contamination in the crude oil as a result of the brine associated with the oil in the ground;

Minerals, clay, silt, and sand from the formation around the oil well bore;

Metals including calcium, zinc, silicon, nickel, sodium, potassium, etc.;

Nitrogen-containing compounds such as amines used to scrub $H_2S$ from refinery gas streams in amine units, or from amines used as neutralizers in crude unit overhead systems, and also from $H_2S$ scavengers used in the oilfield; and Iron sulfides and iron oxides resulting from pipeline and vessel corrosion during production, transport, and storage.

Desalting is necessary prior to further processing to remove these salts and other inorganic materials that would otherwise cause fouling and deposits in downstream heat exchanger equipment and/or form corrosive salts detrimental to crude oil processing equipment. Further, these metals can act as poisons for the catalysts used in downstream refinery units and can cause furnace coking. Thus, the contaminants may include, but not necessarily be limited to, metals, salts, solids other than salts, amines, and combinations thereof. The metals may include, but not necessarily be limited to, those in Periodic Table Groups IA, IIA, IVA, IB, IIB, VB, VIB, and VIII. More particularly the metals include, but are not necessarily limited to, calcium, magnesium, iron, zinc, nickel, chromium, lead, cadmium, copper, and combinations thereof.

Effective crude oil desalting can help minimize the effects of these contaminants on the crude unit and downstream operations. Proper desalter operations provide the following benefits to the refiner:

Reduced crude unit corrosion.

Reduced crude preheat system fouling.

Reduced potential for distillation column damage.

Reduced energy costs.

Reduced downstream process and product contamination.

Desalting is the resolution of the natural emulsion of water that accompanies the crude oil by creating another emulsion in which about 5 percent relative wash water is dispersed into the oil using a mix valve. The emulsion mix is directed into a desalter vessel containing a parallel series of electrically charged plates. Under this arrangement, the oil and water emulsion is exposed to the applied electrical field. An induced dipole is formed on each water droplet within the emulsion that causes electrostatic attraction and coalescence of the water droplets into larger and larger droplets. Eventually, the emulsion resolves into two separate phases—the oil phase (top layer) and the water phase (bottom layer). The streams of desalted crude oil and effluent water are separately discharged from the desalter.

The entire desalting process is a continuous flow procedure as opposed to a batch process. Normally, chemical additives are injected before the mix valve to help resolve the oil/water emulsion in addition to the use of electrostatic coalescence. These additives effectively allow small water droplets to more easily coalesce by lowering the oil/water interfacial tension.

Crude oil that contains a high percent of particulate solids can complicate the desalting process. The particulate solids, by nature, would prefer to transfer to the water phase. However, much of the solids in a crude oil from a field exists in tight water-in-oil emulsions. That is, oil-wetted solids in high concentration in the crude may help form tight oil and water emulsions that are difficult to resolve. These tight emulsions are often referred to as "rag" and may exist as a layer between the separated oil and water phases. The rag layer inside the desalter vessel may grow to such an extent that some of it will be inadvertently discharged with the water phase. This is a problem for the waste water treatment plant since the rag layer still contains a high percentage of unresolved emulsified oil.

As mentioned, much of the solids encountered during crude oil desalting consists of iron, most commonly as particulate iron such as iron oxide, iron sulfide, etc. Other metals that are desirably removed include, but are not necessarily limited to, calcium, zinc, silicon, nickel, sodium, potassium, and the like, and typically a number of these metals are present. Some of the metals may be present in a soluble form. The metals may be present in inorganic or organic forms. In addition to complicating the desalter operation, iron and other metals are of particular concern to further downstream processing. This includes the coking operation since iron and other metals remaining in the processed hydrocarbon yields a lower grade of coke. Removing the metals from the crude oil early in the hydrocarbon processing stages is desired to eventually yield high quality coke as well as to limit corrosion and fouling processing problems.

Several treatment approaches have been made to reduce total metal levels and these all center on the removal of metals at the desalter unit. Normally, the desalter only removes water soluble inorganic salts such as sodium or potassium chlorides. Some crude oils contain water insoluble metal organic acid salts such as calcium naphthenate and iron naphthenate, which are soluble or dispersed as fine particulate matter in the oil but not in water.

It would thus be desirable to develop a composition and method employing it that would cause most or all of the metals in the crude oil to transfer from the oil phase in a desalter operation, with little or no oil carryunder in the aqueous phase. Nonyl phenol resins have been used as desalting additives in the past, but these materials have come under suspicion as possible hormonal mimics and are ineffective by themselves of removing metals such as calcium or iron.

SUMMARY

There is provided, in one non-limiting form, a method of transferring contaminants from a hydrocarbon phase to a water phase in a refinery desalting process, where the method includes adding to a wash water an effective amount of a composition to transfer contaminants from a hydrocarbon phase to an aqueous phase, the composition comprising a water-soluble component selected from the group consisting of polyhydroxy carboxylic acids having 5 to 12 carbon atoms, ammonium salts thereof, alkali metal salts thereof, and mixtures of all of these, where the wash water has a pH of 6 or below. The method additionally includes mixing the wash water with crude oil to create an emulsion and resolving the emulsion into the hydrocarbon phase and the aqueous phase in a refinery desalting process using electrostatic coalescence, where at least a portion of the contaminants are transferred to the aqueous phase In another non-limiting embodiment, there is provided a treated hydrocarbon emulsion including crude oil, water having a pH of 6 or below, contaminants, and a composition in an effective amount to transfer contaminants from a hydrocarbon phase to an aqueous phase, the composition comprising a water-soluble component selected from the group consisting of polyhydroxy carboxylic acids having 5 to 12 carbon atoms, ammonium salts thereof, alkali metal salts thereof, and mixtures of all of these.

DETAILED DESCRIPTION

Figure 1:
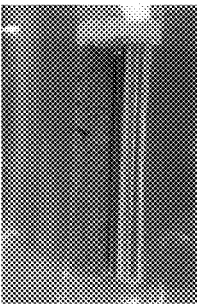
FIG. 1 is a series of photographs of identical carbon steel coupons that are untreated and treated with glucaric acid showing corrosion at pH of 5.0, 5.5, and 6.5, for Example 26.
Figure 1:
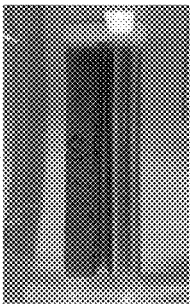
Figure 1:
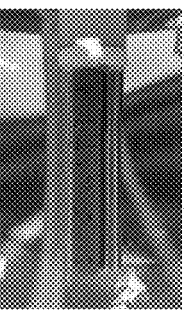
Figure 1:
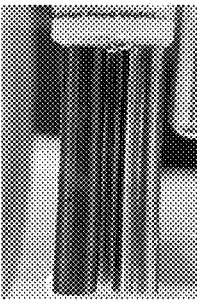
Figure 1:
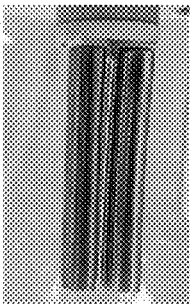
Figure 1:
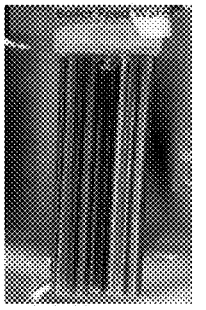

It has been discovered that the addition of water-soluble C5-C12 polyhydroxy carboxylic acids to a hydrocarbon, such as crude oil, can significantly reduce the amount of calcium and other contaminants (e.g. metals and/or amines) in the hydrocarbon when it is run through a desalter in a refinery. The inventors have compared the "normal" desalting on a reference crude oil containing higher than normal amounts of calcium and found minimal calcium removal. The addition of water-soluble C5-C12 polyhydroxy carboxylic acids such as glucaric (also known as sacharric acid) in levels of up to a molar 5:1 ratio with calcium, results in much lower metals and/or amine content of the desalted oil; alternatively the ratio may be up to 4:1; in another non-limiting embodiment up to 3:1; in a different non-restrictive version up to 2:1; and in another alternate version about 1:1.

Issues with C2-C4 alpha-hydroxy acids, such as those described in U.S. Pat. No. 7,497,943 (incorporated herein by reference in its entirety), include, but are not necessarily limited to, dose rate, water solubility as calcium salts, and volatility of the acid in a crude distillation tower. For example, acids like glycolic acid or lactic acid make a 2:1 salt with calcium in the crude, i.e. $(HOCH_2COO)_2Ca$ (calcium glycolate). Acids like glucaric acid form a 1:1 salt with calcium, such as the following structure (I), as one non-limiting example, whereas a 2:1 salt of adipic acid with calcium is shown at structure (II):

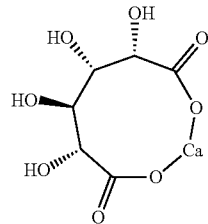

(I)

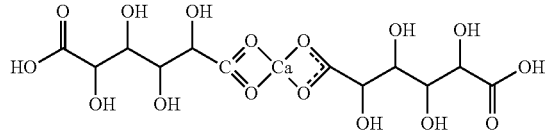

(II)

The 1:1 stoichiometry rather than a 2:1 structure helps reduce dose rates necessary to tie up the calcium in a crude oil. However, it will be appreciated that mole ratio dosages of higher than 1:1 may be suitable or necessary to be sure as much of the contaminant as possible is contacted by the water-soluble component.

Previously it was thought that hydroxy acids having carbon numbers above C2-C4 would produce calcium salts that were insoluble and thus not easy to extract into the desalter brine. The best example of this concern is citric acid (a C6 poly-hydroxy acid) and the calcium citrate deposits it forms in a desalter as shown in S. LORDO, et al., "Desalter Acidification Additives and Their Potential Impacts on Crude Units," NACE Corrosion 2008, Paper No. 08556, 2008. The glucaric acid is also a poly hydroxyl C6 acid but unlike citric acid it forms salts with sufficient solubility in water that it is able to extract the metals from the crude in a desalter. This avoids the deposits shown in the LORDO paper (which lead to failure of the grids in the desalter). Finally one issue seen with acids such as glycolic is they are volatile enough to distill (if they are left in the desalted crude) to the top of the distillation tower where they reduce water pH and increase the neutralizer demand. In contrast, glucaric acid is not as volatile. For instance, a boiling point of 766° F. (408° C.) (from http://www.chemspider.com/Chemical-Structure.30577.html) is provided for glucaric acid, which indicates it will not distill to the top of a distillation tower like more volatile acids in the '943 patent. Because it is not as volatile, additional neutralizer need not be used.

The levels of metals other than calcium such as iron, zinc, silicon, nickel, sodium and potassium are also reduced by the method described herein. The removal of particulate iron in the form of iron oxide, iron sulfide, etc. is a specific, non-limiting embodiment of the method. By "removing" the metals and/or amines from the hydrocarbon or crude is meant any and all partitioning, sequestering, separating, transferring, eliminating, dividing, removing, of one or more metal from the hydrocarbon or crude to any extent.

Being an aqueous additive, the water-soluble C5-C12 polyhydroxy carboxylic acids are added to the wash water in the desalter. This improves distribution of the acid in the oil during mixing, such as at and after a mix valve, although addition to the wash water should not necessarily be viewed as a requirement for the composition described herein to work.

The compositions and method described herein will be valuable to produce high quality (i.e., high purity) coke from crude that may originally have contained high concentrations of metals and/or amines and solids, including iron-based solids. Further, the method described herein advances the technology by removing inorganic material from the crude oil without discharging any oil or emulsion to the waste treatment plant.

In method described herein, it will be understood that the metals include, but are not necessarily limited to, those of Groups IA, IIA, IVA, IB, IIB, VB, and VIII of the Periodic Table (CAS version). In another non-limiting embodiment, the metals include, but are not necessarily limited to calcium, magnesium, iron, zinc, nickel, chromium, lead, cadmium, copper, and combinations thereof. In particular, nickel is a known poison for catalysts used in fluid catalytic cracking units (FCCUs) downstream.

The amines removed in accordance with the method described herein may include, but are not necessarily limited to, monoethanolamine (MEA); dieth-anolamine (DEA); tri-ethanolamine (TEA); N-methylethanolamine; N,N-dimethyl-ethanolamine (DMEA); morpholine; N-methyl morpholine; ethylenediamine (EDA); methoxypropylamine (MOPA); N-ethyl morpholine (EMO); N-methyl ethanolamine, N-methyldiethanolamine and combinations thereof.

In one embodiment of the method, the composition to transfer contaminants from a hydrocarbon phase to a water phase contains water-soluble C5-C12 polyhydroxy carboxylic acids. Hydroxy acids are defined herein as not including or exclusive of acetic acid. Acetic acid has sometimes been used to remove metals as well, but it has a high oil solubility and tends to stay with the hydrocarbon coming from the desalter. The acidity of the acetic acid can then cause corrosion problems in the crude unit. The water-soluble C5-C12 polyhydroxy carboxylic acids are much more water-soluble and will not partition as much into the crude oil, thus reducing downstream concerns. They are also less volatile and do not distill into the crude unit overhead system where they can increase corrosion rates when combined with the water usually present at this location.

With the acids in the '943 patent it is often necessary to add a separate corrosion inhibitor to the formulation to protect the desalter wash water lines. It has been surprisingly discovered that the polyhydroxy carboxylic acids described herein additionally inhibit metal corrosion of metal pipe or other equipment used in a crude unit, and thus the method additionally comprises inhibiting metal corrosion using these polyhydroxy carboxylic acids in effective amounts to inhibit corrosion. The metal pipe and/or other equipment include, but are not necessarily limited to, any pipe, conduit, valve, meter, pump, tower, or other equipment used in a crude unit or refinery desalting process. The metal defined herein with respect to corrosion inhibition is different from the metal that may be in the contaminant removed. The data in U.S. Patent Application Publication Nos. 2015/0376041 A1, 2015/0376799 A1, and 2016/0229726 A1 show the beneficial effects of some water-soluble C5-C12 polyhydroxy carboxylic acids in regard to corrosion protection. All of these published applications are incorporated herein in their entirety by reference. Thus, in one non-limiting embodiment of the method and compositions herein the C5-12 polyhydroxy carboxylic acids may be used in the absence of a different added corrosion inhibitor. Effective amounts of the C5-12 polyhydroxy carboxylic acids to inhibit corrosion may range from about 1 ppm independently to about 2000 ppm, alternatively from about 15 to about 1000 ppm, based on the crude oil.

In one preferred, non-limiting embodiment of the method, the water-soluble C5-C12 polyhydroxy carboxylic acids may have the added benefits of a higher boiling point, and increased water solubility. A higher boiling point means the additive will not distill into the distillate fractions in the crude unit and cause corrosion or product quality concerns. The higher water solubility also favors removal of the additive from the crude in the desalter and reduces the amount that may reach the downstream processing units. Suitable water-soluble C5-C12 polyhydroxy carboxylic acids include, but are not necessarily limited to, polyhydroxy carboxylic acids having 5 to 12 carbon atoms, ammonium salts thereof, alkali metal salts thereof, and mixtures thereof. In another non-limiting embodiment the polyhydroxy carboxylic acids have 6 to 12 carbon atoms, alternatively have 7 to 12 carbon atoms, and in another non-restrictive version have 8 to 12 carbon atoms. Specific suitable polyhydroxy carboxylic acids include, but are not necessarily limited to, glucaric acid (also called saccharic acid), mucic acid, iduronic acid, galacturonic acid, glucuronic acid, digalacturonic acid, and combinations thereof. In another non-restrictive embodiment, the polyhydroxy carboxylic acid does not include gluconic acid.

In particular, the definition of water-soluble C5-C12 polyhydroxy carboxylic acids includes ammonium salts and alkali metal salts (e.g. sodium and potassium salts, etc.) of these hydroxyacids alone or in combination with the other water-soluble hydroxyacids mentioned. Such salts would be formed in the desalter wash water as the system's pH was adjusted with pH adjusters such as sodium hydroxide, potassium hydroxide, ammonia, and the like.

In another non-limiting embodiment the water-soluble hydroxyacids do not include citric acid, malic acid, tartaric acid, mandelic acid, and/or lactic acid. In yet another non-limiting embodiment of the method and composition described herein, the definition of water-soluble C5-C12 polyhydroxy carboxylic acids does not include organic acid anhydrides, particularly acetic, propionic, butyric, valeric, stearic, phthalic and benzoic anhydrides.

It is expected that the water-soluble C5-C12 polyhydroxy carboxylic acids will be used together with other additives including, but not necessarily limited to, corrosion inhibitors (other than the polyhydroxy carboxylic acids defined herein), demulsifiers, pH adjusters, metal chelants, scale inhibitors, hydrocarbon solvents, and mixtures thereof, in a commercial process. Metal chelants are compounds that complex with metals to form chelates. In particular, mineral acids may be used since metal removal is best accomplished at an acidic pH. The use of combinations of water-soluble C5-C12 polyhydroxy carboxylic acids and mineral acids may give the best economics in a commercial application. Suitable mineral acids for use in conjunction with the water-soluble C5-C12 polyhydroxy carboxylic acids include, but are not necessarily limited to, sulfuric acid, hydrochloric acid, phosphoric acid, nitric acid, phosphorous acid, and mixtures thereof. As noted, in one non-limiting embodiment, the method herein is practiced in a refinery desalting process that involves washing the crude oil emulsion with wash water. In one non-limiting embodiment, the amount of mineral acid used may be sufficient to lower the pH of the wash water to 6 or below. As noted below, in some embodiments of the method described herein, it may be necessary or suitable to lower the pH of the wash water to 5 or below, alternatively to 4 or below. The water-soluble C5-C12 polyhydroxy carboxylic acids (and salts thereof) are expected to be useful over a wide pH range, although in some situations it may be necessary or desirable to adjust the pH to achieve the desired contaminant transfer or separation.

It will be appreciated that the necessary, effective or desired proportions of the C5-C12 polyhydroxy carboxylic acids and/or the mineral acid will be difficult to predict in advance in general, since these proportions or dosages are dependent upon a number of factors, including, but not necessarily limited to, the nature of the hydrocarbon (e.g. crude oil), the concentration of metal species and amine to be removed, the temperature and pressure conditions of method, the particular polyhydroxy carboxylic acid and mineral acid used, etc. In general, the more of a species, such as calcium, there is to be removed, the more of the reactive acid that must be added. Since many undesirable species are affected, a successful metal removal process may require more reactive acid on a stoichiometric basis than would be indicated by the concentration of only the target species. It may therefore be insufficient to only just add enough acid to get the pH below 6, whether by using C5-C12 polyhydroxy carboxylic acid and/or a mineral acid. Nevertheless, in order to give some sense of the proportions that may be used, in one non-limiting embodiment, the composition may comprise down to about 1 wt. % C5-C12 polyhydroxy carboxylic acid; and up to about 20 wt. % mineral acid, in another non-restrictive version from about 1 independently to about 100 wt. % polyhydroxy carboxylic acid; and from about 1 independently to about 20 wt. % mineral acid, and in another non-restrictive version from about 25 independently to about 85 wt. % water-soluble polyhydroxy carboxylic acid; and from about 15 independently to about 75 wt. % mineral acid. In some non-limiting embodiments of the method, the mineral acid is optional and may be omitted. The term "independently" as used herein with respect to a range means that any threshold may be used together with any other threshold to give a suitable alternative range.

In one typical but non-limiting embodiment of the method, the composition is injected into the wash water before the mix valve in neat form or diluted with water, alcohol or similar solvent suitable to keep all composition components in solution. The amount of solvent used may range from about 10 independently to about 95 wt. %, based on the total composition; alternatively from about 20 independently to about 10 wt. %.

The concentration of the composition described herein to be used in the crude oil to be effective is very difficult to predict in advance since it depends on multiple, interrelated factors including, but not limited to, the composition of the crude oil, the desalting conditions (temperature, pressure, etc.), the flow rate of the crude oil and its residence time in the desalter, among others. Nevertheless, for the purposes of non-limiting illustration, the proportion of the active water-soluble polyhydroxy carboxylic acid that may be used in the crude (not including any solvent or mineral acid) may range from about 1 independently to about 2000 ppm-w; alternatively from about 10 independently to about 500 ppm-w and will depend on the concentration of metal species to be removed. The organic hydroxy acid reacts stoichiometrically with the organo metal and/or amine species to be removed. As noted, the water-soluble C5-C12 polyhydroxy carboxylic acids are expected to form 1:1 salts with the metals being remove, e.g. calcium, whereas in contrast when glycolic acid or lactic acid is used a 2:1 salt is made thus the C5-C12 polyhydroxy carboxylic acid described herein are expected to be used at lower dosages than acids such as glycolic acid and/or lactic acid. Thus a lower equivalent amount of polyhydroxy carboxylic acids having 5 to 12 carbon atoms (and/or salts thereof) may be added compared to the concentration of metal species to be removed. A slight excess of the acid will ensure that the reaction goes to completion. In one non-limiting embodiment, the amount of polyhydroxy carboxylic acid is stoichiometric with the amount of metals and/or amines present, or greater than stoichiometric. For economic reasons the refinery may chose to leave some of the metal and/or amine species in the crude at an acceptably low level of contamination of hydrocarbon in some alternate embodiments. In those cases the treatment level of the hydroxy acids can be correspondingly reduced.

A goal in the practice of the method described herein is that there be no oil carryunder in the aqueous phase, and that at least oil carryunder is minimized. Further, while it is a goal that all of the metals and/or amines transfer to the aqueous phase, in one non-limiting theory, some of the metals and/or amines may be transferred from the oil phase into the rag. This proportion of metals and/or amines is then removed when the rag is cleaned out.

It is also a goal, of course, that in the practice of the method all of the metals and/or amines transfer to the aqueous phase. In another non-limiting embodiment of the method, 25% or less metal and/or amine is present in the hydrocarbon phase after desalting, alternatively 20% or less metal and/or amine remains, and in a different non-restrictive embodiment only 10% or less remains. In some cases the refinery may chose to leave higher percentages of metal and/or amine contaminants in the crude if the detrimental effects are judged to be economically acceptable.

The invention will be illustrated further with reference to the following Examples, which are not intended to limit the invention, but instead illuminate it further. Throughout this specification, proportions are on a weight basis unless otherwise noted.

The following Electrostatic Desalting Dehydration Apparatus (EDDA) Test Method was employed to screen possible blend compositions. The EDDA is a laboratory test device to simulate the desalting process.

EDDA Test Method

1. Add 800, 600 or 400 ml of crude oil to be tested minus the percent of wash water (depending on the number of tubes the EDDA will hold) to a Waring blender.
2. Add the required percentage of wash water to the blender to bring the total volume up to 800, 600 or 400 ml.
3. Mix at 50% speed (on the Variac) for 30 seconds. The speed can be reduced if the ΔP on the mix valve is low.
4. Pour the mixture into the EDDA tubes to just below the 100 ml line.
5. Place the tubes in the EDDA heating block that is at the desired test temperature (100° C.-130° C.).
6. Add the desired quantity of demulsifier, in ppm, to each tube. With every test, a blank must be run for comparison purposes.
7. Place the screw top electrode in the tubes and allow the samples to heat for approximately 15 minutes.
8. Tighten the caps and shake each tube 100-200 times and place back in the heating block to reheat for five minutes.
9. Place the electrode cover over the tubes and lock into place. Make sure that there is good contact between the cover and the electrode caps.
10. Set the time for five minutes and run at 1500-3000 volts, depending on the test requirements.
11. At the end of the five minutes, pull the tubes out and check for the percent water drop. Also check the quality of the interface and the quality of the water and record it.

12. Repeat steps 9, 10, and 11 until the desired total residence time is achieved.
13. Determine the best candidates and run a dehydration test on those samples.
    a) Fill the desired number of 12.5 ml centrifuge tubes to the 50% mark with xylene.
    b) Use a glass syringe to pull 5.8 ml of dehydrated crude sample from the desired level in the tube and mix in with the xylene in the centrifuge tubes.
    c) Centrifuge the tubes at 2000 rpm for 5 minutes.
    d) Check for the quantity of water, emulsion, and solids that are present in the bottom of the tube and record.

Analysis for Metals

After completing the EDDA test, use a glass syringe and cannula (long, wide bore needle), to withdraw two 20 ml aliquots of the EDDA desalted crude oil. Abstract the oil at a level in the EDDA tube that is at 25 ml and 70 ml below the surface of the oil. The two samples (top cut and bottom cut) are each analyzed for metal concentration by whatever appropriate method (wet ash or microwave digestion, acidification, dilution, AA or ICP analysis—in Table I, ICP was used). A similar procedure would be used to generate oil and water samples that could be analyzed by ion chromatography for other contaminants such as amine salts.

The crude oil used was from an West African country that has a high calcium content. The polyhydroxy carboxylic acid was glucaric acid. The demulsifier was a complex blend of phenol resins. The results are shown in Table I. The first column presents the metal detected, along with the Example number. The second column presents the amount of the metal in the crude treated only with the demulsifier. The third column presents the amount of the metal in the crude treated with 180 ppm glucaric acid and the demulsifier. The fourth column presents the amount of the metal in the brine treated only with the demulsifier. The fifth column presents the amount of the metal in the brine treated with 180 ppm glucaric acid and the demulsifier. It will be seen that the use of glucaric acid removes a large amount of the calcium (Ex. 5) and iron (Ex. 10) from the hydrocarbon phase (crude) into the aqueous phase (brine).

TABLE I

EXAMPLES 1-25
Removal of Metals from Oil-Hydrocarbon with Glucaric Acid (ICP)

| Ex./ Metal | | Crude with demulsifier only | Desalter Crude treated with 180 ppm Glucaric Acid | Brine with demulsifier only | Brine water treated with 180 ppm Glucaric Acid |
|---|---|---|---|---|---|
| 1 | Al | <0.1 | <0.1 | 0.03 | 0.8 |
| 2 | B | 0.4 | <0.1 | 0.94 | <0.1 |
| 3 | Ba | 0.6 | 0.4 | 3.53 | 10 |
| 4 | Be | <0.1 | <0.1 | <0.01 | <0.1 |
| 5 | Ca | 71 | 12 | 149 | 797 |
| 6 | Cd | <0.1 | <0.1 | <0.01 | <0.1 |
| 7 | Co | 0.5 | 0.4 | 0.02 | 0.9 |
| 8 | Cr | <0.1 | <0.1 | <0.01 | <0.1 |
| 9 | Cu | <0.1 | <0.1 | 0.09 | 0.3 |
| 10 | Fe | 11 | 3.8 | 0.1 | 52 |
| 11 | K | <0.1 | <0.1 | 6.89 | 5.8 |
| 12 | Li | <0.1 | <0.1 | 0.03 | <0.1 |
| 13 | Mg | 2.6 | 1.8 | 12 | 19 |
| 14 | Mn | 2.2 | 0.9 | 0.2 | 14 |
| 15 | Mo | 0.3 | <0.1 | 0.01 | 0.3 |
| 16 | Na | <0.1 | 1.7 | 214 | 205 |
| 17 | Ni | 5.9 | 6 | <0.01 | <0.1 |
| 18 | Pb | <0.1 | 0.5 | 0.01 | 0.7 |
| 19 | Sb | <0.1 | 0.4 | <0.01 | 0.9 |
| 20 | Si | 0.5 | <0.1 | 5.89 | <0.1 |
| 21 | Sn | 1 | 0.7 | <0.01 | <0.1 |
| 22 | Sr | 0.4 | <0.1 | 3.36 | 8.4 |
| 23 | Ti | 0.1 | 0.1 | <0.01 | 0.1 |
| 24 | V | 0.5 | 0.6 | 0.05 | 0.3 |
| 25 | Zn | 2.8 | 4.3 | 0.15 | 2.1 |

Example 26

With the acids in the '943 patent it is often necessary to add a separate corrosion inhibitor to the formulation to protect the desalter wash water lines. It has been surprisingly discovered that the polyhydroxy carboxylic acids described herein additionally inhibit metal corrosion of metal pipe or other equipment used in a crude unit, and thus the method additionally comprises inhibiting metal corrosion using these polyhydroxy carboxylic acids in effective amounts to inhibit corrosion. Below is a representative data of corrosion inhibition performance of glucaric acid in water. The test was run at varying pH. As shown in FIG. 1, adding 30 ppm glucaric acid to boiler feed water has inhibited the corrosion of carbon steel even at pH below 6 where a typical corrosion inhibitor fails to inhibit. Thus, adding polyhydroxy acid such as glucaric acid not only removes the contaminants but inherently inhibited the corrosion of the metal and metal alloy pipes.

Example 27

Figure 2:
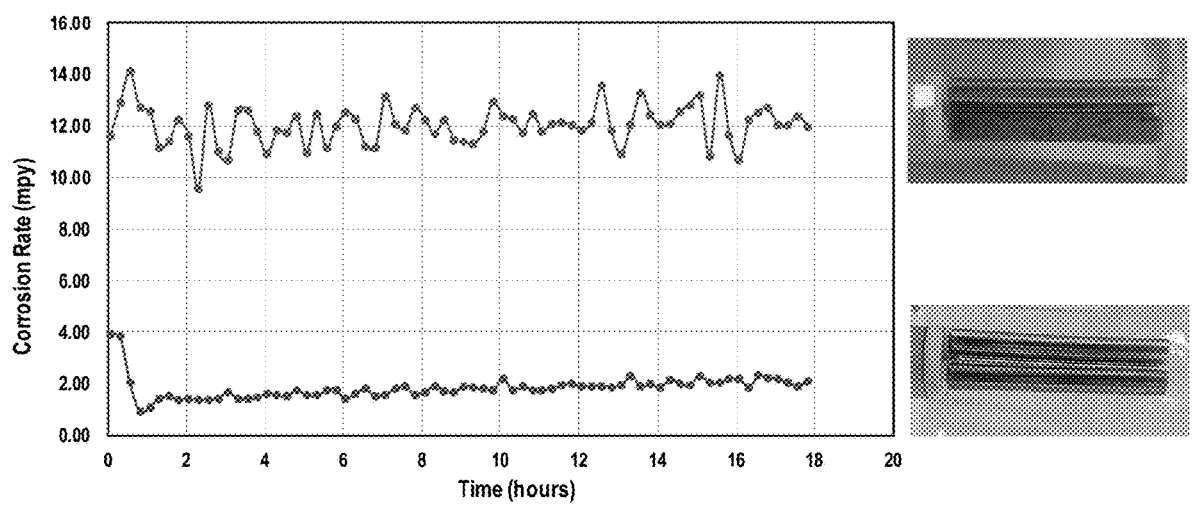
FIG. 2 is a graph of corrosion rate as a function of time for carbon steel in boiler feed water that is untreated (upper curve) and treated (lower curve) with glucaric acid at pH=5.5.

Shown in FIG. 2 is an example of the corrosion rate (2 mpy) of a treated system vs. an untreated system (12 mpy) at pH=5.5.

In the foregoing specification, the invention has been described with reference to specific embodiments thereof, and has been demonstrated as effective in transferring metals, e.g. calcium, potassium, iron, etc., and/or amines from crude oil to the aqueous phase in bench scale desalting testing, as non-limiting examples. However, it will be evident that various modifications and changes can be made thereto without departing from the broader scope of the invention as set forth in the appended claims. Accordingly, the specification is to be regarded in an illustrative rather than a restrictive sense. For example, specific water-soluble C5-C12 polyhydroxy carboxylic acids, ammonium salts thereof, alkali metal salts thereof, and combinations of any of these with mineral acids, contaminants, additional components, other than those specifically exemplified or mentioned, or in different proportions, falling within the claimed parameters, but not specifically identified or tried in a particular application to transfer metals and/or amines into the aqueous phase, are within the scope of the method and compositions described herein. Similarly, it is expected that the inventive compositions will find utility as metal transfer compositions for other fluids besides crude oil emulsions.

The present invention may suitably comprise, consist of or consist essentially of the elements disclosed and may be practiced in the absence of an element not disclosed. For instance, the method of transferring contaminants from a hydrocarbon phase to a water phase in a refinery desalting process may comprise, consist essentially of, or consist of adding to a wash water an effective amount of a composition to transfer contaminants from a hydrocarbon phase to an aqueous phase, where the composition comprises, consists essentially of, or consists of a water-soluble component selected from the group consisting of polyhydroxy carboxylic acids having 5 to 12 carbon atoms, ammonium salts thereof, alkali metal salts thereof, and mixtures of these, where the wash water has a pH of 6 or below; mixing the wash water with crude oil to create an emulsion; and resolving the emulsion into the hydrocarbon phase and the aqueous phase in a refinery desalting process using electrostatic coalescence, where at least a portion of the contaminants are transferred to the aqueous phase.

Further, there may be provided a treated hydrocarbon emulsion consisting essentially of or consisting of crude oil; water having a pH of 6 or below; contaminants; and a composition in an effective amount to transfer contaminants from a hydrocarbon phase to an aqueous phase, the composition comprising, consisting essentially of, or consisting of a water-soluble component selected from the group consisting of polyhydroxy carboxylic acids having 5 to 12 carbon atoms, ammonium salts thereof, alkali metal salts thereof, and mixtures of these.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A method of transferring contaminants from a hydrocarbon phase to a water phase in a refinery desalting process comprising:

adding to a wash water an effective amount of a composition to transfer contaminants from a hydrocarbon phase to an aqueous phase, the composition comprising a water-soluble component selected from the group consisting of polyhydroxy carboxylic acids having 5 to 12 carbon atoms selected from the group consisting of glucaric acid, iduronic acid, galacturonic acid, glucuronic acid, digalacturonic acid, and combinations thereof, and where the polyhydroxy carboxylic acid does not include gluconic acid, ammonium salts thereof, alkali metal salts thereof, and mixtures of any of these, where the wash water has a pH of 6 or below;
mixing the wash water with crude oil to create an emulsion; and
resolving the emulsion into the hydrocarbon phase and the aqueous phase in a refinery desalting process using electrostatic coalescence, where at least a portion of the contaminants are transferred to the aqueous phase.

2. The method of claim 1 where the contaminant is selected from the group consisting of metals, salts, solids other than salts, amines, and combinations thereof.

3. The method of claim 2 where the contaminant comprises a metal selected from the metals in a Periodic Table Group selected from the group consisting of IA, IIA, IVA, IB, IIB, VB, VIB, and VIII.

4. The method of claim 3 where the metal is selected from the group consisting of calcium, magnesium, iron, zinc, nickel, chromium, lead, cadmium, copper, and combinations thereof.

5. The method of claim 1 where the polyhydroxy carboxylic acid is present in an amount to additionally inhibit metal corrosion of metal pipe or other equipment used in a crude unit, and the method additionally comprises inhibiting metal corrosion.

6. The method of claim 5 where the polyhydroxy carboxylic acid forms a molar 1:1 salt with the contaminant.

7. The method of claim 1 where in the adding of the composition, the composition additionally comprises a mineral acid.

8. The method of claim 7 where the amount of mineral acid is sufficient to lower the pH of the wash water to 6 or below.

9. The method of claim 1 where in the adding of the composition, the polyhydroxy carboxylic acid is present in the emulsion in an amount ranging from about 1 to about 2000 ppm, based on the crude oil.

10. The method of claim 1 where the composition additionally comprises at least one additional component selected from the group consisting of a water or alcohol solvent, a corrosion inhibitor other than the polyhydroxy carboxylic acid, a demulsifier, a scale inhibitor, metal chelants, wetting agents and mixtures thereof.

11. The method of claim 5 in an absence of a different added corrosion inhibitor.

12. A method of transferring contaminants from a hydrocarbon phase to a water phase in a refinery desalting process comprising:

adding to a wash water an effective amount of a composition to transfer contaminants from a hydrocarbon phase to an aqueous phase, the composition comprising a water-soluble component selected from the group consisting of polyhydroxy carboxylic acids having 5 to 12 carbon atoms selected from the group consisting of glucaric acid, iduronic acid, galacturonic acid, glucuronic acid, digalacturonic acid, and combinations thereof, and where the polyhydroxy carboxylic acid does not include gluconic acid, ammonium salts thereof, alkali metal salts thereof, and mixtures of any of these, where the wash water has a pH of 6 or below;

mixing the wash water with crude oil to create an emulsion; and resolving the emulsion into the hydrocarbon phase and the aqueous phase in a refinery desalting process using electrostatic coalescence, where at least a portion of the contaminants are transferred to the aqueous phase;

where the effective amount of the composition additionally inhibits metal corrosion of metal pipe or other equipment used in a crude unit, and the method additionally comprises inhibiting metal corrosion, in an absence of a different added corrosion inhibitor.

13. The method of claim 12 where the contaminant is selected from the group consisting of metals, salts, solids other than salts, amines, and combinations thereof.

14. The method of claim 13 where the contaminant comprises a metal selected from the metals in a Periodic Table Group selected from the group consisting of IA, IIA, IVA, IB, IIB, VB, VIB, and VIII.

15. The method of claim 14 where the metal is selected from the group consisting of calcium, magnesium, iron, zinc, nickel, chromium, lead, cadmium, copper, and combinations thereof.

16. The method of claim 12 where the polyhydroxy carboxylic acid forms a molar 1:1 salt with the contaminant.

17. The method of claim 12 where in the adding of the composition, the polyhydroxy carboxylic acid is present in the emulsion in an amount ranging from about 1 to about 2000 ppm, based on the crude oil.

18. The method of claim 12 where the composition additionally comprises at least one additional component selected from the group consisting of a water or alcohol solvent, a demulsifier, a scale inhibitor, metal chelants, wetting agents and mixtures thereof.

19. A method of transferring contaminants from a hydrocarbon phase to a water phase in a refinery desalting process comprising:

adding to a wash water an effective amount of a composition to transfer contaminants from a hydrocarbon phase to an aqueous phase, the composition comprising a water-soluble component selected from the group consisting of polyhydroxy carboxylic acids having 5 to 12 carbon atoms selected from the group consisting of glucaric acid, iduronic acid, galacturonic acid, glucuronic acid, digalacturonic acid, and combinations thereof, and where the polyhydroxy carboxylic acid does not include gluconic acid, ammonium salts thereof, alkali metal salts thereof, and mixtures of any of these, where the wash water has a pH of 6 or below;

mixing the wash water with crude oil to create an emulsion; and resolving the emulsion into the hydrocarbon phase and the aqueous phase in a refinery desalting process using electrostatic coalescence, where at least a portion of the contaminants are transferred to the aqueous phase;

where:

the contaminant is selected from the group consisting of metals, salts thereof, iron-based solids, and combinations thereof, where the metal is selected from the group consisting of calcium, magnesium, iron, zinc, nickel, chromium, lead, cadmium, copper, and combinations thereof; and the polyhydroxy carboxylic acid forms a molar 1:1 salt with the contaminant.

20. The method of claim 19 where the polyhydroxy carboxylic acid is present in an amount to additionally inhibit metal corrosion of metal pipe or other equipment used in a crude unit, and the method additionally comprises inhibiting metal corrosion.

* * * * *